Aug. 27, 1957  ISOKAZU TANAKA ET AL  2,804,590
APPARATUS APPLICABLE TO COMPARISON OF ELECTRIC DEVICES
Filed June 11, 1954

United States Patent Office 2,804,590
Patented Aug. 27, 1957

2,804,590

APPARATUS APPLICABLE TO COMPARISON OF ELECTRIC DEVICES

Isokazu Tanaka, Masao Asakura, and Michio Hara, Tokyo-to, Japan

Application June 11, 1954, Serial No. 436,152

Claims priority, application Japan June 20, 1953

2 Claims. (Cl. 324—26)

This invention relates to a novel apparatus being fit for the comparative adjustment or measurement of various electric elements such as amplification factor of vacuum-tube amplifier or transistor, reactance of reactance-tube and the like.

The object of this invention is to provide an effective apparatus capable of adjusting or measuring amplification factor of an electric vacuum-tube amplifier or a multiple type amplifier composed of groups more than two, or reactance of an electric circuit containing an electric vacuum-tube with very simple, accurate and visible manner.

The said object and other objects of this invention have been accomplished by an apparatus which comprises a source of carrier wave, a switching device capable of successively supplying the said carrier wave to each of the input terminals of electric devices more than two and to be compared to adjust or measure output of any one of the said electric devices, a comparison device being supplied with output voltages of the said electric devices, a cathode ray tube being supplied, at the electron beam deflecting device thereof, with output voltage of the said comparison device, and a driving device capable of revolving the said comparison device together with the said deflecting device, the said all devices being electrically connected to each other so that fluorescent images corresponding to the output voltages of the said electric devices may appear on the fluorescent surface of the said cathode ray tube and the outputs of the said electric devices may be compared, adjusted or measured while viewing the said images.

The present invention will be more easily understood by reference to the following description taken in connection with the accompanying drawings, wherein.

Figure 1:
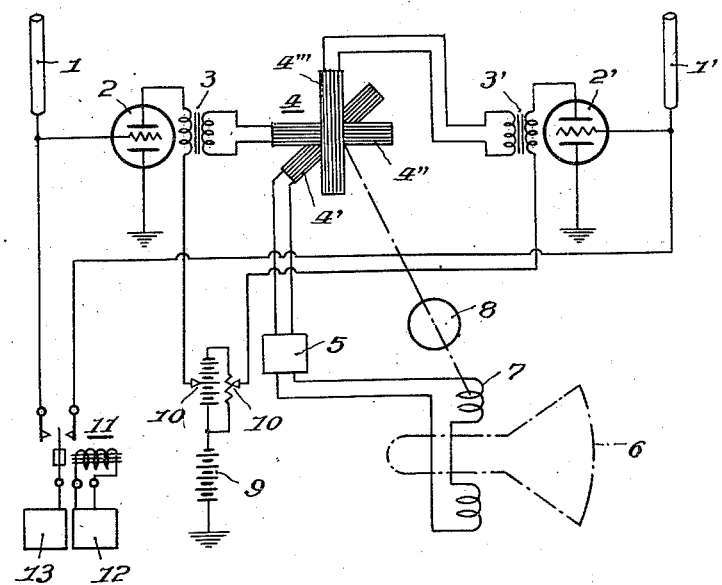
Fig. 1 is a connection diagram of a wireless direction-finder provided with Adcock type antennas combined with a cathode ray tube capable of visibly showing the detected direction, to which the idea of this invention is applied.

Referring to Fig. 1, antennas 1 and 1' are made as U type Adcock antennas. The said antennas are connected to grid-electrodes of vacuum-tube amplifiers 2 and 2', respectively as shown in the drawing so that the induced voltages of the said antennas may be supplied to the said grid-electrodes, plate voltages of the said amplifiers being supplied by an electric source 9. A goniometer 4 is connected with the said amplifiers 2 and 2' through respective coupling transformers 3 and 3' so that the output voltages of the said amplifiers may be differentially superposed in the goniometer 4. The said goniometer 4 consists of an exciting coil 4" connected to output coil of the said transformer 3, another exciting coil 4''' connected to output coil of the said transformer 3' and located at right angles with the said coil 4", and a search coil 4' arranged in the said coils 4" and 4''' so as to be revolved relative to the said coils 4" and 4'''. The said search coil 4' is connected to the electron beam deflecting coil 7 of a cathode ray tube 6 through a detecting and amplifying apparatus 5 so that the output voltage of the said search coil 4' may be, after detected and amplified, supplied to the said coil 7 to deflect electron beam of the said cathode ray tube.

In the above-mentioned apparatus, when the search coil 4' and deflecting coil 7 are synchronously revolved by an electric motor 8, output voltage variation of the search coil 4' due to revolution thereof can be described on the fluorescent surface of the cathode ray tube 6, because electron beam of the said tube 6 is controlled by the output voltage of the search coil 4'. Therefore, detection of coming wave direction can be effectively achieved.

The detecting system as described above is well-known, but in the said system it is usually desirable to set the antennas 1 and 1', vacuum-tube amplifiers 2 and 2', coupling transformers 3 and 3' and goniometer 4 in electrically balanced conditions. Among them, the said antennas, transformers and goniometer can be easily balanced, but it is generally difficult to balance the vacuum-tube amplifiers 2 and 2'.

The said disadvantage, according to this invention, has been eliminated by an apparatus composed of an electric source 13 capable of sending a carrier wave of a suitable frequency such as, for instance, about scores of kc. and a switching device 11 such as polarized relay capable of feeding alternately the input terminals of the vacuum-tube amplifiers 2 and 2' with the said carrier wave. In this case, it is preferable that switching frequency is equal to the revolving frequency of the search coil 4' or less than that. For example, when revolving frequency of the said coil 4' is 15 cycles per second, it is preferable to fix the switching number of the said device 11 to 7.5 times per second. Therefore, when a polarized relay of moving core type is used as the switching device 11, it is preferable to use an electric source 12 of about 7.5 cycles per second.

Figure 2:
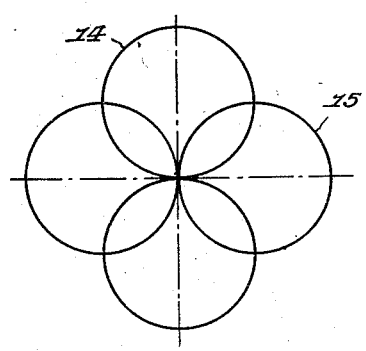
Fig. 2 is a circle diagram of fluorescent images of the cathode ray tube in the detector illustrated in Fig. 1.
Figure 3:
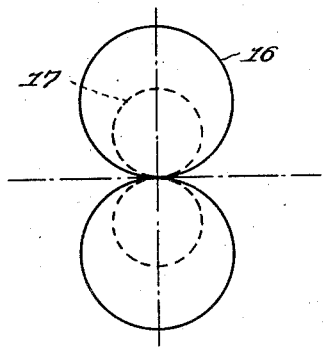
Fig. 3 is other circle diagram corresponding to the circle diagram in Fig. 2.

If a suitable carrier wave is alternately supplied to the vacuum-tube amplifier 2 and 2' in such a manner as described above, on the fluorescent surface of the cathode ray tube will appear fluorescent images as will be described in connection with Figs. 2 and 3 in the following part.

In the apparatus illustrated in Fig. 1, when the supply of output voltage of the coupling transformer 3 to the exciting coil 4" and that of output voltage of the coupling transformer 3' to the exciting coil 4''' are made alternately by means of the said switching device 11, envelope images 14 and 15 of 8 type will be viewed on the fluorescent surface of the cathode ray tube 6. In this case, as the induced voltage in the search coil 4' varies with the relative position between the exciting coils and the search coil 4', the said induced voltage varies with revolving angle of the motor 8. If the goniometer 4 is in a perfectly balanced condition, the said images become same and the angle between them becomes 90°.

The said images 14 and 15 are produced by the output voltages of the coupling transformers 3 and 3' and the circle diameters of the said images are proportionate to the output voltages of the said transformers, respectively, so that the said diameters vary with the amplification factors of the vacuum-tube amplifiers 2 and 2'. Therefore, when plate voltages of the said amplifiers, the said voltages being supplied by the electric source 9, are adjusted by a voltage regulator 10 while viewing the fluorescent images 14 and 15 so that circle diameters of the said images may be equal or difference between them may be constant, amplification factors of the vacuum-tube amplifier 2 and 2' can be easily and accurately adjusted so that they may be equal or the difference between them may be constant. In this case, if any one of the said amplification factors is taken as the standard reference value, then the other can be easily measured by comparing the former with the latter. For the purpose of facilitating comparison between the said fluorescent images of 8 type, it may be adapted to supply alternately only one exciting coil, for example, 4″ with each of the output voltages of the coupling transformers 3 and 3′ so that double images 16 and 17 as shown in Fig. 3 may be alternately obtained.

The above example relates to a comparison between only two vacuum-tube amplifiers, but the idea of this invention may be applicable to any other case, wherein three or more vacuum-tube amplifiers are used. In this case, number of the exciting coils of the goniometer, their positions and the construction of the switching device for feeding carrier wave should be corresponded to number of the vacuum-tube amplifiers.

In the embodiment of this invention, instead of goniometer any other electric devices such as differential type condenser, differential type variable resistance, switching device capable of switching output terminals of electric devices and the like may be used as the substituent of the goniometer.

As will be clearly understood from the above description, according to this invention, amplification factors of vacuum-tube amplifiers or amplifying apparatus containing multiple amplifiers more than two groups, or reactance in an electric circuit containing reactance-electron-tube can be visibly adjusted or measured with simple and accurate manner.

Since it is obvious that many changes and modifications can be made in the above-mentioned details without departing from the nature and spirit of this invention, it is not limited within the said illustration.

We claim:

1. Apparatus for the comparison, testing and adjustment of the output voltages and reactances of a plurality of amplifiers provided with antenna means, a voltage supply source, a plurality of carrier wave sources furnishing input signals to said amplifiers when connected therewith, switching means to alternately and sequentially connect and disconnect each of said amplifiers with associated carrier wave sources, a comparison device, said comparison device comprising a goniometer including exciting coils having connecting means with the outputs of said amplifiers, said goniometer also including a search coil rotatably mounted, a cathode ray tube provided with deflection means, detection and amplifying means providing connection means between said search coil and said cathode ray tube deflection means; driving means comprising on electric motor to revolve synchronously said search coil and said deflection means so that the trace on said cathode ray tube is that of the output voltage of the amplifier being read, and voltage regulation means to adjust output voltages of said amplifiers.

2. An apparatus in accordance with claim 1, in which the frequency of said switching means is not more than the frequency of said driving means.

References Cited in the file of this patent
UNITED STATES PATENTS

| | | |
|---|---|---|
| 2,388,262 | Ganiayre et al. | Nov. 6, 1945 |
| 2,473,491 | Posthumus | June 14, 1949 |
| 2,477,028 | Wilkie | July 26, 1949 |
| 2,525,675 | Heller | Oct. 10, 1950 |